(12) United States Patent
Fisher et al.

(10) Patent No.: US 10,472,990 B2
(45) Date of Patent: Nov. 12, 2019

(54) NOZZLE MAINTENANCE APPARATUS AND METHOD

(71) Applicant: General Electric Company, Schenectady, NY (US)

(72) Inventors: Andrew James Fisher, Simpsonville, SC (US); John William Herbold, Fountain Inn, SC (US); Thomas Alan Mogle, II, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 15/345,588

(22) Filed: Nov. 8, 2016

(65) Prior Publication Data

US 2018/0128129 A1    May 10, 2018

(51) Int. Cl.
    *F01D 25/28* (2006.01)
    *F01D 9/02* (2006.01)
    *B23P 6/00* (2006.01)

(52) U.S. Cl.
    CPC ............ *F01D 25/285* (2013.01); *B23P 6/002* (2013.01); *F01D 9/02* (2013.01); *F05D 2220/32* (2013.01); *F05D 2230/60* (2013.01); *F05D 2230/70* (2013.01); *F05D 2230/72* (2013.01)

(58) Field of Classification Search
    CPC .......... F01D 25/285; F01D 9/02; B23P 6/002; F05D 2220/32; F05D 2230/70; F05D 2230/60; F05D 2230/72
    See application file for complete search history.

(56) References Cited

U.S. PATENT DOCUMENTS

| 3,432,048 | A | 3/1969 | Musgrove et al. |
| 4,455,730 | A | 6/1984 | Guenther |
| 5,921,075 | A | 7/1999 | Shimoyama et al. |
| 6,792,809 | B1* | 9/2004 | Moore ................. F01D 25/285 73/583 |
| 7,094,025 | B2 | 8/2006 | Arness et al. |
| 8,117,727 | B2 | 2/2012 | McCarvill |
| 8,381,379 | B2 | 2/2013 | Holmes et al. |
| 8,550,522 | B2 | 10/2013 | Echarri Latasa et al. |
| 8,595,931 | B2 | 12/2013 | Riddell et al. |
| 8,757,962 | B2 | 6/2014 | Herbold et al. |
| 8,789,248 | B2 | 7/2014 | McKay |

(Continued)

FOREIGN PATENT DOCUMENTS

| EP | 2944760 A1 | 3/2019 |
| WO | 2005111380 A1 | 11/2005 |

OTHER PUBLICATIONS

European Search Report dated Jun. 27, 2018 for Application No. 17200124.0; p. 12.

*Primary Examiner* — John C Hong
(74) *Attorney, Agent, or Firm* — Theodoros Stamatiadis; Hoffman Warnick LLC

(57) ABSTRACT

Various embodiments include apparatuses for performing maintenance on a gas turbine (GT) nozzle, along with related methods. One apparatus can include: a nozzle engagement sled for releasably engaging the nozzle, the nozzle engagement sled including: a sled body; a locking member coupled with the sled body, the locking member sized to complement a slot in the nozzle; a sled slot within a side of the sled body, the sled slot for engaging a rail within the GT; and at least one wheel for transporting the sled body within the GT.

20 Claims, 10 Drawing Sheets

(56) References Cited

U.S. PATENT DOCUMENTS

2005/0100445 A1    5/2005   Anner et al.
2006/0039790 A1    2/2006   Hartmann et al.
2010/0071183 A1    3/2010   McCarvill
2012/0317772 A1   12/2012   Herbold et al.
2015/0023790 A1    1/2015   Friis

* cited by examiner

NOZZLE MAINTENANCE APPARATUS AND METHOD

TECHNICAL FIELD

The subject matter disclosed herein relates to turbomachines. More particularly, the subject matter relates to gas turbomachines and associated maintenance apparatuses.

BACKGROUND

Conventional gas turbines generally include three sections: a compressor section, a combustor section and a turbine section. The compressor section compresses ambient air, and provides that compressed air to the combustion section where it is combined with fuel to generate a heated working fluid (gas). The heated gas is provided to the turbine section, where it impacts turbine blades to drive rotation of the turbine rotor shaft.

In the turbine section, sets of rotating blades are attached to a rotor, and sets of stationary nozzles are dispersed between each adjacent set of rotating blades for directing working fluid (gas) to the rotating blades. Each pairing of rotating blades and stationary nozzles are conventionally referred to as a turbine stage. The high-pressure, high-temperature environment within the turbine section can cause mechanical wear-and-tear on the blades and nozzles, requiring periodic, and in some cases, scheduled maintenance. Because the blades and nozzles reside within a turbine housing with small clearances between components, it can be difficult to access those blades and nozzles for scheduled or other maintenance. For example, the nozzles are retained within a ring that surrounds the rotor, and are loaded into (and unloaded out of) the ring and pinned into position next to an adjacent nozzle. Additionally, seals for each nozzle are individually loaded/unloaded with those nozzles, further complicating the maintenance process.

Conventional approaches for loading and/or unloading these nozzles involve loading each individual nozzle segment from above a horizontal joint surface of the turbine casing and lowering it to its adjacent part using rigging and/or other manual approaches. This process can be time-consuming and costly.

BRIEF DESCRIPTION

A first aspect of the disclosure includes an apparatus for performing maintenance on a nozzle of a gas turbine (GT), the apparatus having: a nozzle engagement sled for releasably engaging the nozzle, the nozzle engagement sled including: a sled body; a locking member coupled with the sled body, the locking member sized to complement a slot in the nozzle; a sled slot within a side of the sled body, the sled slot for engaging a rail within the GT; and at least one wheel for transporting the sled body within the GT.

A second aspect of the disclosure includes a method of installing a nozzle below a horizontal joint surface of a gas turbine (GT), the method including: coupling a nozzle maintenance apparatus to the nozzle, the nozzle maintenance apparatus having: a nozzle engagement sled for releasably engaging the nozzle, the nozzle engagement sled including: a sled body; a locking member coupled with the sled body, the locking member sized to complement a slot in the nozzle; a sled slot within a side of the sled body, the sled slot for engaging a rail within the GT; and at least one wheel for transporting the nozzle engagement sled within the GT; lowering the nozzle maintenance sled and the nozzle into the GT; and actuating the locking member to disengage the nozzle inside the GT.

A third aspect of the disclosure includes a method of un-installing a nozzle from a location below a horizontal joint surface of a gas turbine (GT), the method including: coupling a nozzle maintenance apparatus to the nozzle, the nozzle maintenance apparatus having: a nozzle engagement sled for releasably engaging the nozzle, the nozzle engagement sled including: a sled body; a locking member coupled with the sled body, the locking member sized to complement a slot in the nozzle; a sled slot within a side of the sled body, the sled slot for engaging a rail within the GT; and at least one wheel for transporting the sled body within the GT; and raising the nozzle maintenance sled and the nozzle out of the GT.

BRIEF DESCRIPTION OF THE DRAWINGS

These and other features of this disclosure will be more readily understood from the following detailed description of the various aspects of the invention taken in conjunction with the accompanying drawings that depict various embodiments of the invention, in which.

Figure 1:
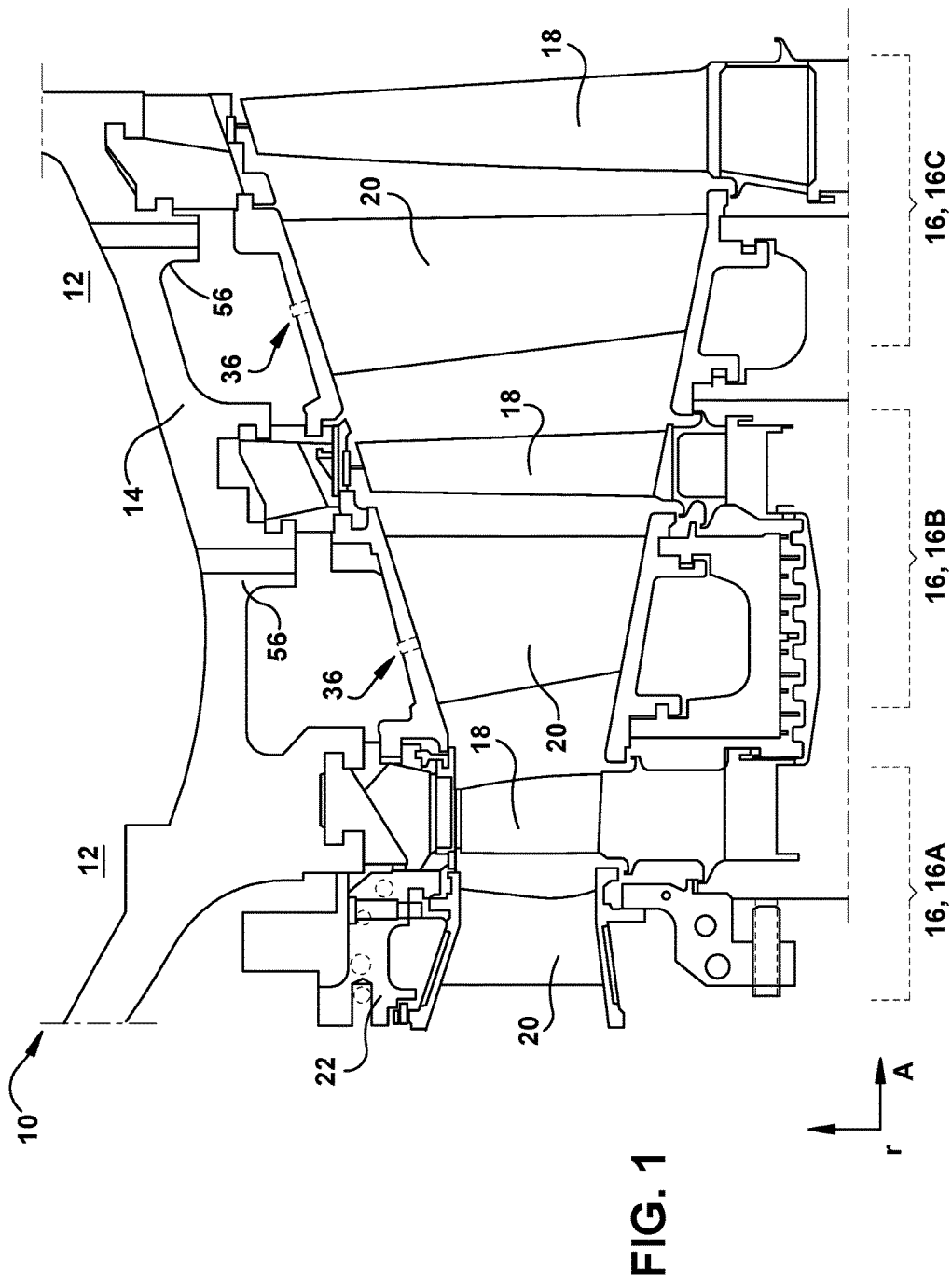
FIG. 1 shows a schematic cut-away view of section of a gas turbine according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted, the subject matter disclosed herein relates to turbomachines (or simply, turbines). More particularly, the subject matter relates to gas turbines and associated maintenance apparatuses for gas turbine nozzles.

As noted herein, conventional approaches for accessing, loading and/or unloading nozzles in a gas turbine for maintenance have significant shortcomings. In the present scenario, performing a "hot gas path" service interval on nozzles while a rotor is in place involves removing nozzles individually using rigging and manual effort. Addressing nozzles that are farther from the horizontal joint surface using these conventional approaches can be difficult, because such nozzles are moving at an angle relative to the rigging and the operator attempting to access those nozzles. Additionally, when loading nozzles using conventional approaches, it can be difficult to ensure that seal placement and integrity are consistent with such limited access and angling relative to the rigging. In these cases, seals may disengage from nozzles or fail to engage with nozzle segments when loaded into the assembly.

In contrast to conventional approaches, various embodiments of the disclosure include a nozzle maintenance apparatus configured to travel within the casing of the gas turbine (GT) and access nozzles individually for maintenance, installation and/or removal. The apparatus is configured to assist in maintenance, installation and/or removal of nozzles in situ, that is, while the GT and rotor assembly is in place. The apparatus can include a nozzle engagement sled configured to releasably engage (e.g., couple and decouple with) a GT nozzle and transport (e.g., guide) that nozzle within the casing of the GT. The nozzle engagement sled can include a locking member (e.g., a pin, hook or other member) sized to complement a slot in the nozzle, and a corresponding lever for actuating the locking member. In some cases, the lever is shaped to allow access from distinct locations within the GT casing (e.g., having a T-shape or other multi-pronged shape). Additionally, the nozzle engagement sled can include a set (one or more) of wheels to aid in movement along the GT casing. In various embodiments, the GT casing includes a slot adjacent the nozzle stage, and the sled is sized to move within that slot. The apparatus can also include a towing system coupled (e.g., mechanically fastened, bolted/screwed, integrally formed, etc.) with the nozzle engagement sled. In these cases, the towing system is configured to raise and/or lower the nozzle engagement sled within the GT casing. The systems disclosed according to various embodiments can improve maintenance processes for GT nozzles relative to the conventional systems and approaches. For example, these systems disclosed according to various embodiments can allow for maintenance, installation and/or removal of GT nozzles within a lower half of a GT casing while those nozzles remain below the horizontal joint surface of the casing (with the rotor installed).

FIG. 1 shows a schematic top-down view of a lower section (half) of a gas turbine (GT) 10 according to various embodiments. The GT 10 is depicted from one portion of the horizontal joint surface 12, which defines the junction between the upper half of the casing (which is removed in this depiction) and the lower half of the casing 14 (only lower half of inner casing shown). As shown, GT 10 can include a plurality of stages 16, where each stage includes a set of (rotatable) blades 18 and a set of (stationary) nozzles 20. While nozzles 20 in the first stage 16A are generally loaded and unloaded into/out of the casing 14 on one or more sections of a ring 22, nozzles 20 in the second stage 16B, third stage 16C and other stages are conventionally loaded/unloaded individually. When nozzles 20 lie below the horizontal joint surface 12, as depicted in FIG. 1, it can be difficult to access that space to perform maintenance on the nozzles, install new nozzles or replace old nozzles.

Figure 2:
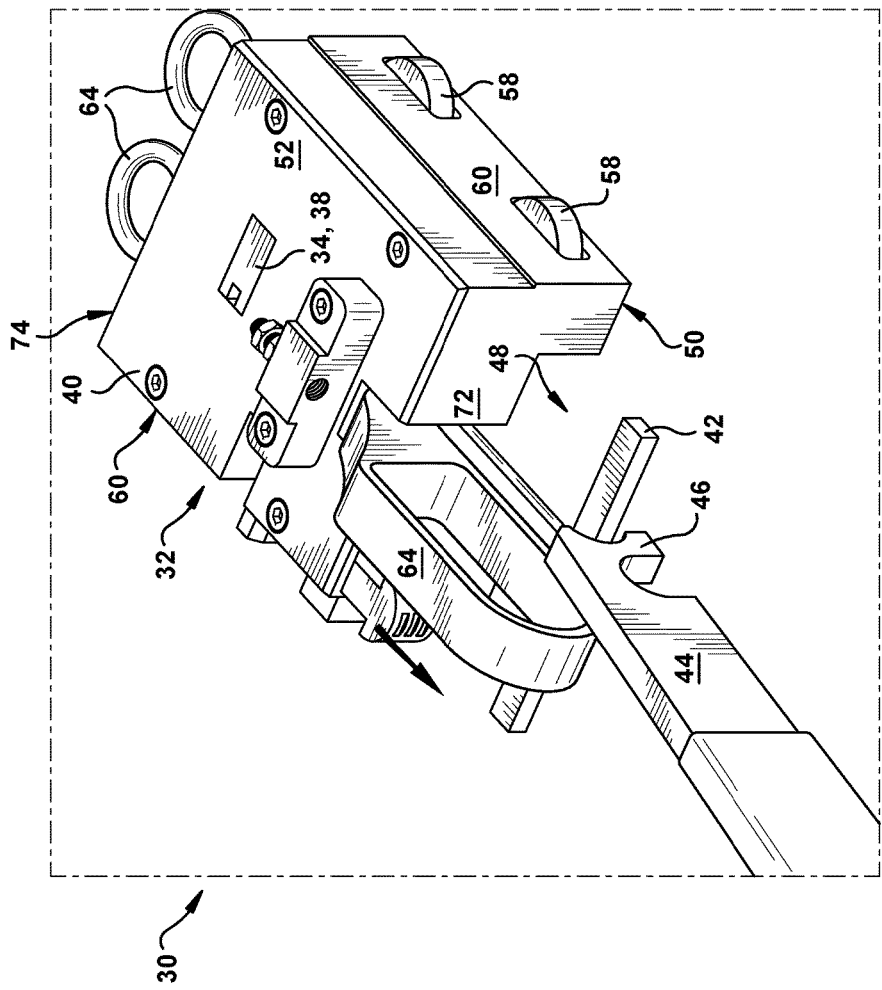
FIG. 2 shows a perspective view of an apparatus according to various embodiments of the disclosure.
Figure 3:
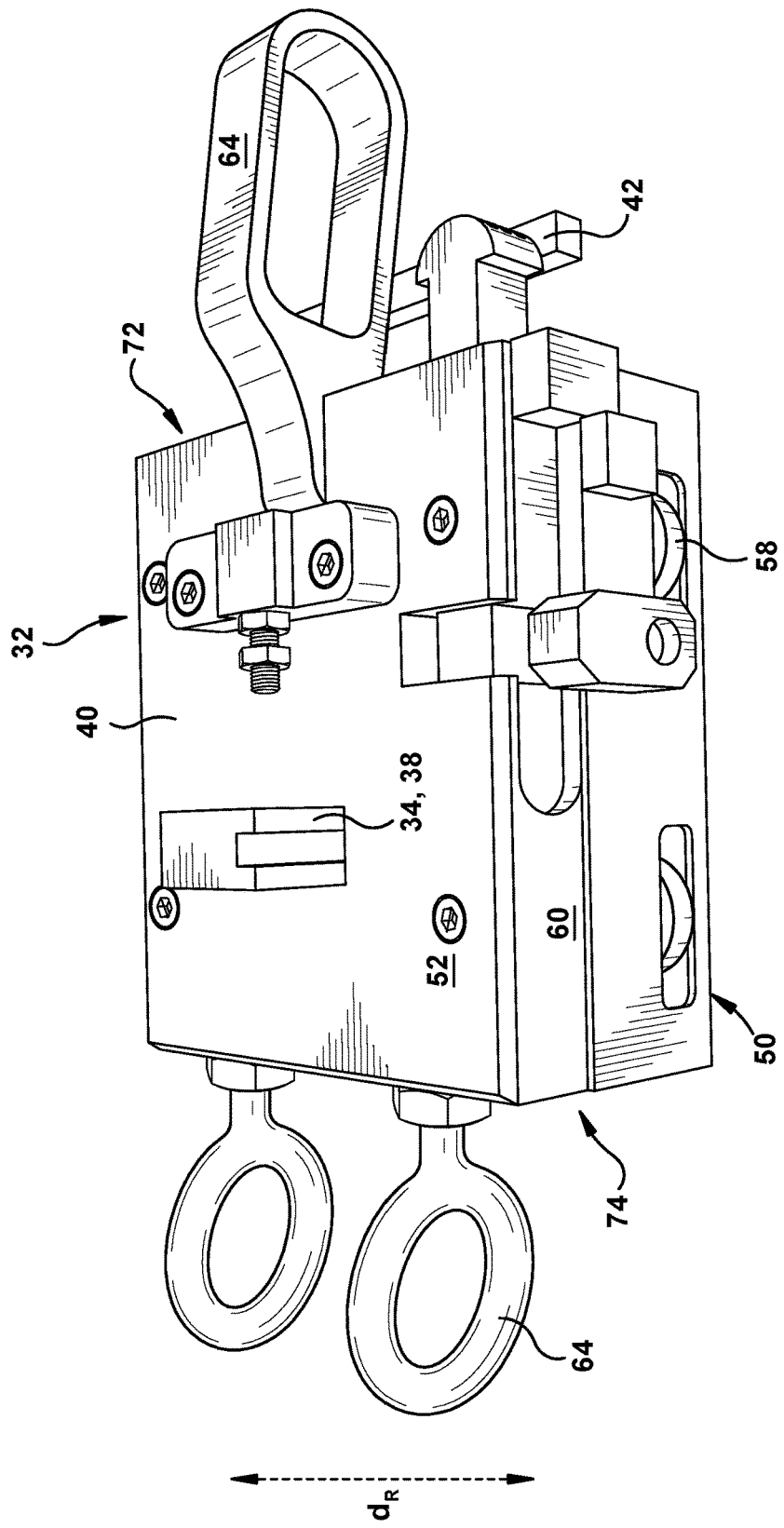
FIG. 3 shows a side perspective view of the apparatus of FIG. 2 according to various embodiments of the disclosure.
Figure 4:
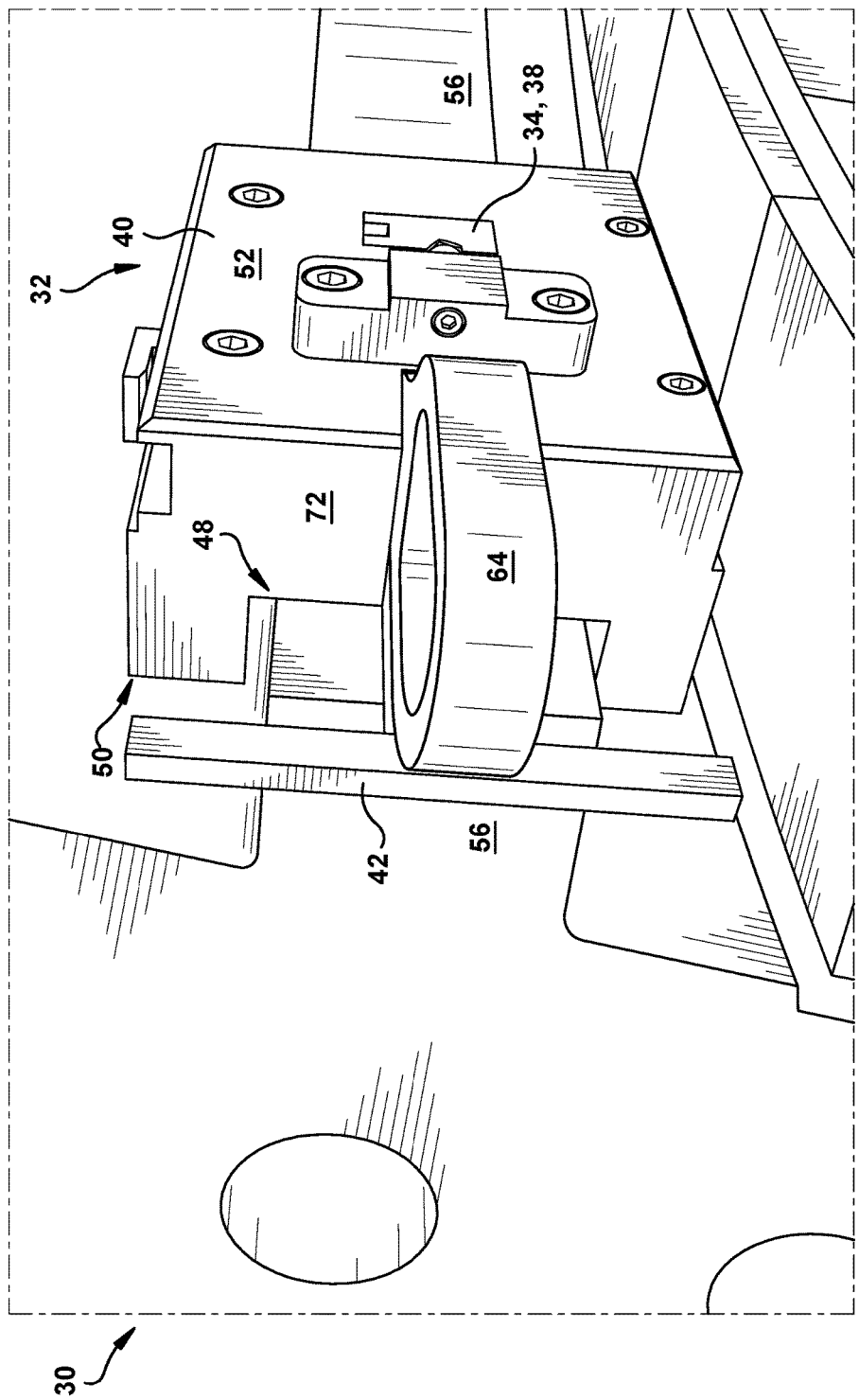
FIG. 4 shows an end perspective view of the apparatus of FIG. 2 according to various embodiments of the disclosure.
Figure 10:
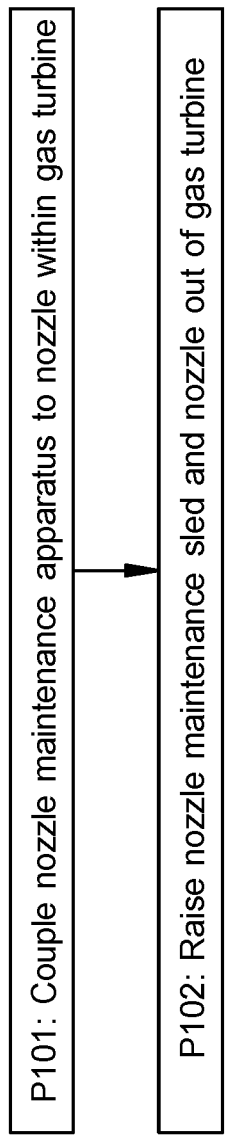
FIG. 10 is a flow diagram illustrating processes of un-installing a nozzle in a gas turbine according to various embodiments of the disclosure.

FIG. 2 shows a perspective depiction of an apparatus 30 for performing maintenance on a nozzle 20 of a GT 10 (FIG. 1) according to various embodiments of the disclosure. As used herein, the term "maintenance" can include installation, removal, rehabilitation, evaluation, or any other form of manipulation conventionally referred to in the art. That is, the apparatus 30 shown in FIG. 2 is configured to perform maintenance on a nozzle 20 within, or being installed within GT 10 (FIG. 10). In some cases, apparatus 30 is configured to perform maintenance on one or more nozzles 20 within the second stage 16B, third stage 16C or another downstream stage 16 (farther from first stage 16A) of GT 10 (FIG. 1). As shown in FIG. 2, apparatus 30 can include a nozzle engagement sled 32 for releasably engaging a nozzle 20. In particular, apparatus 30 can be beneficial in engaging nozzles 20 located within the lower half of the casing 14 of GT 10 (FIG. 1), in areas below the horizontal joint surface 12. FIG. 3 shows a side perspective view of a portion of apparatus 30, and FIG. 4 shows an end view perspective of the portion of apparatus 30 in FIG. 3, along with a portion of GT 10 (in particular, casing 14). In various embodiments, apparatus 30 and its components are formed of a metal (e.g., steel), alloy(s), or other composite material capable of withstanding the mechanical stresses associated with the functions described herein. In some cases, apparatus 30 includes components formed integrally (e.g., via casting, additive manufacturing, etc.) and/or formed separately and subsequently coupled (e.g., via mechanical fastening, bolting, clamping, etc.).

Figure 5:
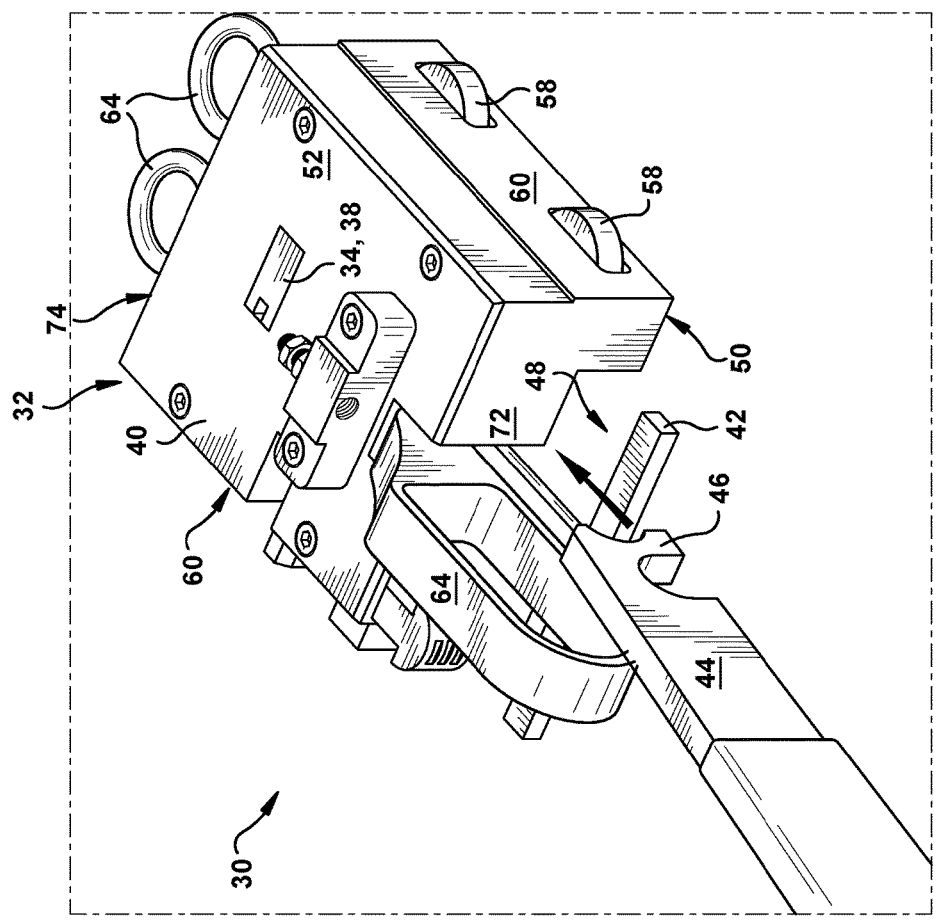
FIG. 5 shows a perspective view of the apparatus of FIG. 2, illustrating actuation of a lever, according to various embodiments of the disclosure.
Figure 6:
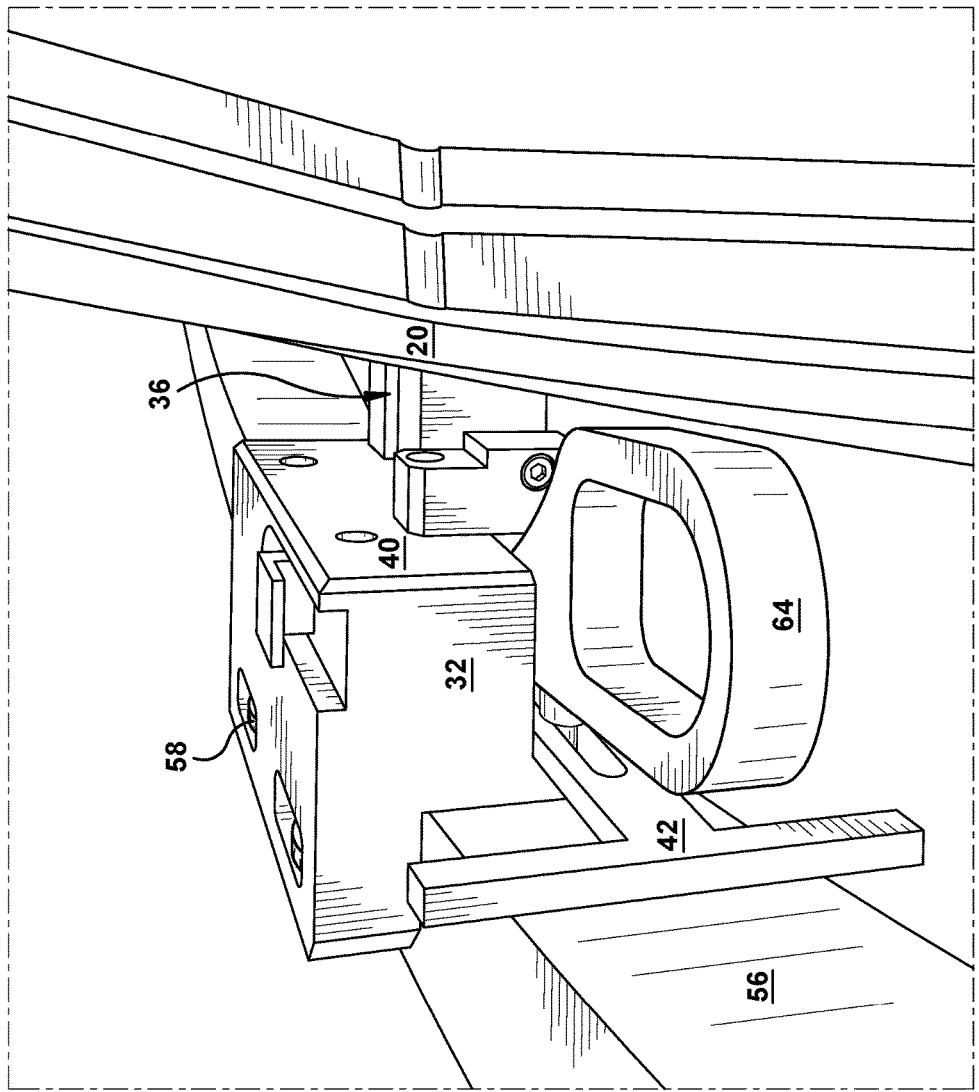
FIG. 6 a perspective view of the apparatus of FIG. 2, engaged with a nozzle, according to various embodiments of the disclosure.
Figure 7:
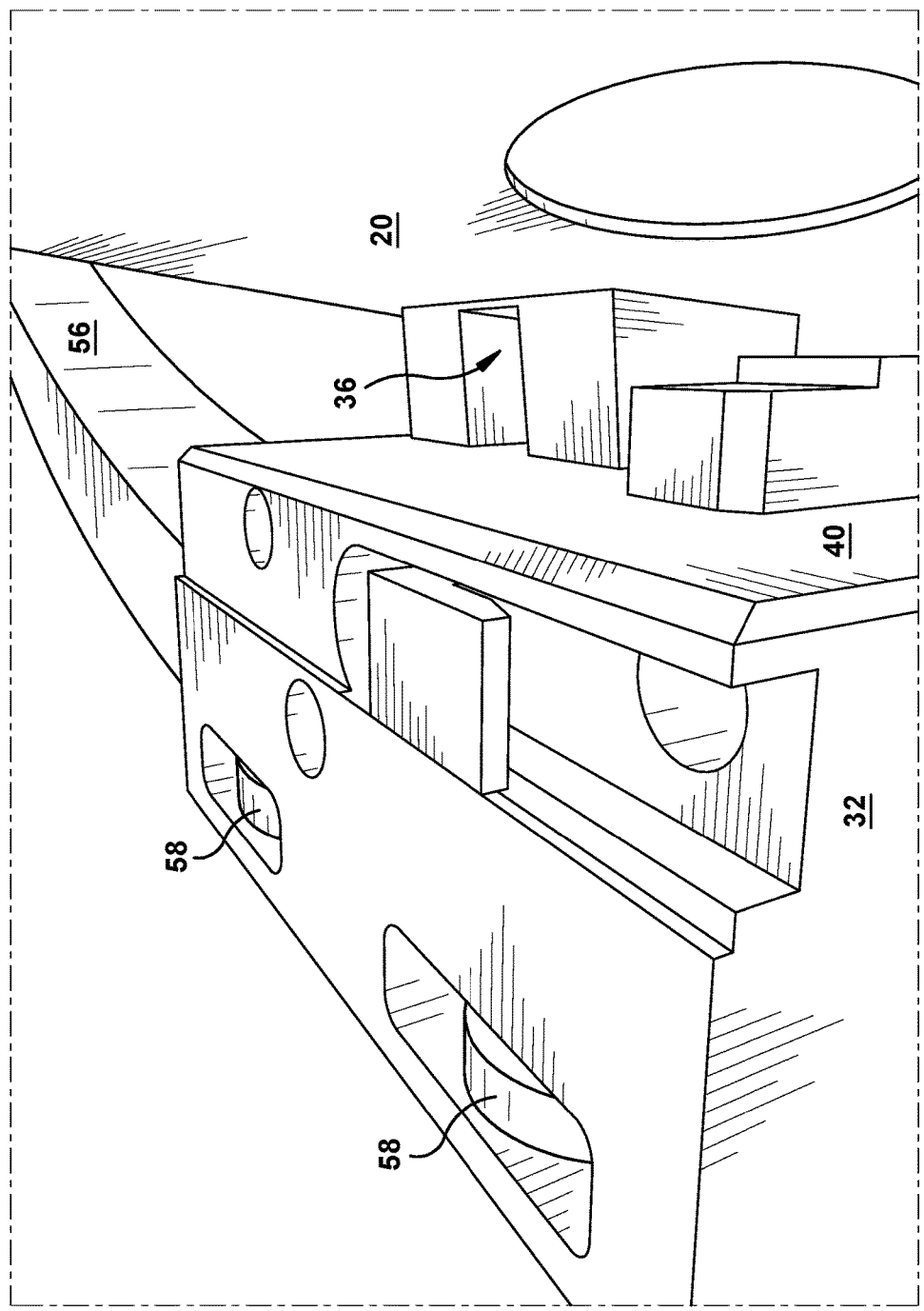
FIG. 7 shows a close-up perspective view of the apparatus shown in FIG. 6.

Referring to FIGS. 2-8, nozzle engagement sled (or simply, sled) 32 can include a locking member 34 coupled with sled 32 and sized to complement a slot 36 in nozzle 20 (shown in phantom as partially obstructed in FIG. 1). In various embodiments, locking member 34 can include at least one of a pin or a hook sized to complement the slot 36 in nozzle 20. FIG. 3 shows a locking member 34, in the form of a pin 38 (e.g., substantially rectangular pin which may include at least partially rounded or beveled edges, and may include an internal slot) that complements slot 36 in nozzle 20 and is configured to engage/disengage slot 36. FIG. 5 also shows this locking member 34 protruding from the body 40 of sled 32 (or, sled body 40) from a distinct perspective. FIGS. 6 and 7 illustrate a perspective views of sled 32 engaged with slot 36 in nozzle 20, as sled 32 traverses the rail 56 within GT 10.

As illustrated in FIGS. 2-8, in some cases, sled 32 further includes a lever 42 connected with locking member 34 for actuating the locking member 34. Lever 42 can have, for example, a T-shape or other multi-pronged shape that enables actuation from a distance (e.g., at a location at or above horizontal joint surface 12). For example, in some cases, apparatus 30 can further include an actuator rod 44 (FIG. 2, FIG. 5) for engaging lever 42 to couple/de-couple sled 32 from nozzle 20. In some cases, actuator rod 44 can include a hook, slot or other contour 46 sized to contact lever 42 and allow an operator (e.g., a human and/or robotic operator) to actuate lever 42 from a distance. As shown in FIGS. 2 and 5 in particular, actuator rod 44 can engage lever 42 to actuate locking member 34, either to protrude from body 40 for engaging slot 36 in nozzle 20, or to retract into sled body 40 for disengaging (or pre-engaging) slot 36 in nozzle 20. For example, FIG. 2 shows lever 42 in a first position prior to actuating locking member 34. That is, lever 42 is in a first position where locking member 34 resides entirely (or substantially entirely) within body 40. FIG. 5 actuator rod actuating lever 42 to move lever into a second position, where locking member 34 protrudes from sled body 40, e.g., for engaging a lot 36 in nozzle 20 (FIG. 1).

FIGS. 2 and 4 show particular additional aspects of sled 32, including a sled slot 48 within a side 50 of sled 32 (opposite side 52 having locking member 34). Sled slot 48 is sized to engage a rail 56 within GT 10 (FIG. 4 and FIG.

1). Rail 56 is positioned radially outward of nozzles 20 (in radial direction (r)) within casing 14, and in some cases, may be at least partially axially offset (in axial direction (A)) from nozzles 20. Rail 56 is sized to engage a set of nozzles including nozzle 20 (FIG. 1), and according to various embodiments, sled slot 48 is sized (e.g., in width and depth) to fit around a portion of rail 56 and move along rail 56 as described herein to perform maintenance on one or more nozzles 20. As shown most clearly in FIGS. 2 and 5, sled 32 can also include at least one wheel 58 for transporting (e.g., guiding) sled 32 within GT 10. Wheel(s) 58 can extend through opposite sides 60 of sled 32 and at least partially reside within sled slot 48. Wheels 58 are configured to contact rail 56 and aid in movement of sled 32 along rail 56 within GT 10.

Figure 8:
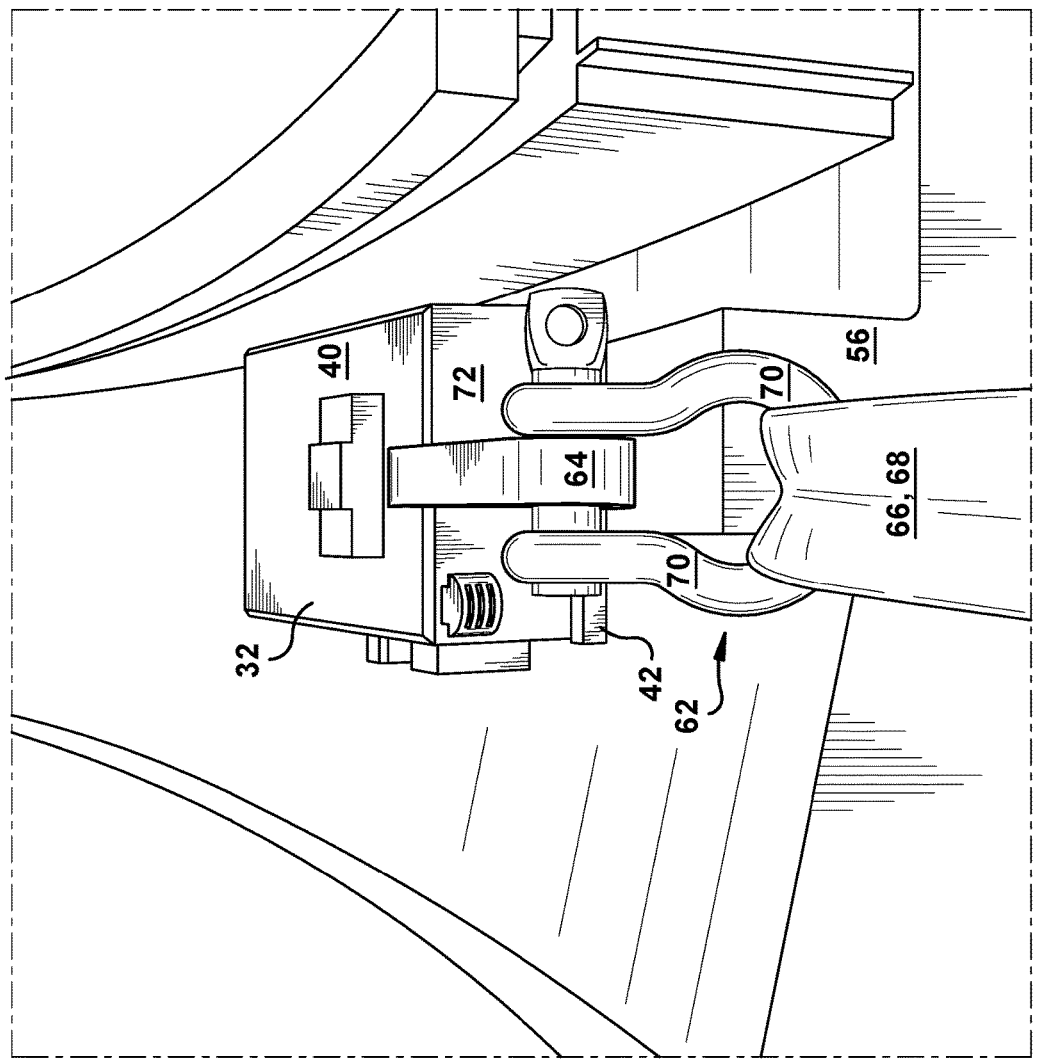
FIG. 8 shows an end view of an apparatus including a towing system according to various embodiments of the disclosure.

As shown in the schematic end view perspective of apparatus 30 in FIG. 8, apparatus 30 can also include a towing system 62 coupled with sled 32. Towing system 62 can be configured to raise and/or lower sled within GT 10 or proximate GT 10. In some cases, as shown in FIGS. 2-8, sled 32 includes a coupler 64 for connecting with towing system 62. In some particular cases, coupler 64 includes at least one of a hook, a loop or a slot sized to engage towing system 62. Towing system 62 can include at least one of a line (e.g., rope, wire, composite material) 66 or a bar 68 sized to engage coupler 64 (line 66 shown in FIG. 8), and can also include a towing coupler 70 for securing coupler 64. Towing coupler 70 can include a hook, ring, or other device shaped to secure coupler 64. Towing system 62 can include a winch or a pneumatic lift coupled with line 66 or bar 68 (lift not shown), and can be used to modify a position of sled 32, e.g., by raising or lowering sled 32 relative to casing 14 of GT 10 (e.g., along rail 56).

Lever 42, in some cases, is located on a same side 72 of sled 32 adjacent the coupler 64. This side 72 may be more easily accessed from at or above horizontal joint surface 12, e.g., using actuator rod 44. An opposing side 74 (FIGS. 2, 3, 5) can also include one or more couplers 64 for connecting with a similar or distinct towing system 62. For example, in some cases, couplers 64 on both sides 72, 74 of sled 32 can be engaged to one or more towing system(s) 62 for guiding sled 32 within GT 10 (e.g., along rail 56). Wheels and/or couplers 64 can be fastened, bolted, screwed, or otherwise coupled to sled 32, or may be integrally formed with one or more components of sled 32.

Figure 9:
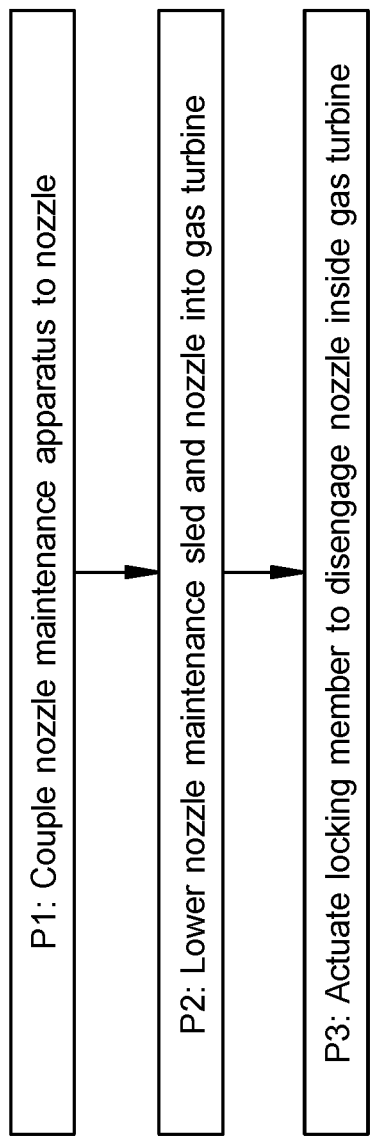
FIG. 9 is a flow diagram illustrating processes of installing a nozzle in a gas turbine according to various embodiments of the disclosure.

According to various embodiments, apparatus 30 may be used in a method of performing maintenance on one or more nozzles 20 (FIG. 1). FIGS. 9 and 10 are flow diagrams illustrating various processes according to embodiments of the disclosure. These processes can apply to some of the apparatuses and components shown and described with reference to FIGS. 1-8, however, these processes are not intended to be limited to those particular components shown and described with reference to those Figures. Additionally, processes may be omitted, added or otherwise reordered according to various embodiments. FIG. 9 shows a flow diagram illustrating processes in installing a nozzle 20 below a horizontal joint surface 12 of a GT 10 (FIG. 1). In some embodiments, this process includes:

Process P1: coupling a nozzle maintenance apparatus (apparatus) 30 to the nozzle 20. As described herein, apparatus 30 can be coupled to nozzle 20 using locking member 34 to engage slot 36 in nozzle 20 (FIG. 1). It is understood that according to various embodiments, a plurality of nozzles 20 (or nozzle segments) can be joined together, e.g., via a seal mechanism or other mechanical linkage, and coupled with nozzle maintenance apparatus 30. In these cases, a "stack" or group of nozzles 20 can be manipulated, for installation purposes, using nozzle maintenance apparatus.

Process P2: after coupling apparatus 30 to nozzle 20, lowering the nozzle maintenance sled (sled) 32 and nozzle(s) 20 into the GT 10 (See, e.g., FIG. 8). In particular this process can include using towing system 62, coupled with sled 32, to lower sled 32 along rail 56 within casing 14 of GT 10. Towing system 62 can be attached to, or include, a lifting/lowering device such as a winch, pneumatic lift and/or hydraulic lift, and can be configured to be operated by a human and/or robotic operator to lower sled 32 and nozzle(s) 20 coupled to sled into a desired position within GT 10.

Process P3: after lowering nozzle(s) 20 into GT 10, actuating the locking member 34 to disengage the nozzle 20 inside the GT 10. This process can include using actuation rod 44 to actuate lever 42 and release locking member 34 from slot 36 once nozzle 20 is at a desired position within GT 10. That is, actuating lever 42 modifies a position of locking member 34 relative to slot 36, effectively disengaging sled 32 from nozzle 20. In some cases, actuating the locking member 34 includes inserting actuator rod 44 inside GT 10 and engaging actuator rod 44 with lever 42.

FIG. 8 shows a flow diagram illustrating processes in un-installing a nozzle 20 below a horizontal joint surface 12 of a GT 10 (FIG. 1). In some embodiments, this process includes:

Process P101: coupling a nozzle maintenance apparatus (apparatus) 30 to the nozzle 20. As described herein, apparatus 30 can be coupled to nozzle 20 using locking member 34 to engage slot 36 in nozzle 20 (FIG. 1). Prior to coupling apparatus 30 to nozzle 20 within GT casing 14 (below horizontal joint surface 12), towing system 62, coupled with sled 32, can be used to lower sled 32 along rail 56 within casing 14 of GT 10. Towing system 62 can be attached to, or include, a lifting/lowering device such as a winch, pneumatic lift and/or hydraulic lift, and can be configured to be operated by a human and/or robotic operator to lower sled 32 into a desired position within GT 10 in order to access nozzle 20. In various embodiments, sled 32 can include a positive stop mechanism for stopping at a location adjacent slot 36, such that locking member 34 is aligned with slot 36 in nozzle. This allows for efficient actuation of locking member 34 to engage slot 36.

Process P102: raising sled 32 and the nozzle 20 out of GT 10. This process can include using towing system 62, coupled with sled 32, to raise sled 32 and the coupled nozzle 20 along rail 56 within casing 14 of GT 10. Once sled 32 and nozzle 20 are at or near horizontal joint surface 12, an operator (e.g., a human operator and/or robotic operator) can actuate (e.g., manually or with a tool) lever 42 to release locking member 34 from slot 36, and allow for removal of nozzle 20 from apparatus 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for performing maintenance on a nozzle of a gas turbine (GT), the apparatus comprising:
   a nozzle engagement sled for releaseably engaging the nozzle, the nozzle engagement sled including:
      a sled body including two opposing sides and a first side extending between and positioned adjacent the two opposing sides;
      a locking member coupled with the sled body, the locking member sized to complement a slot in the nozzle;
      a sled slot within the first side of the sled body and formed between the two opposing sides of the sled body, the sled slot for engaging a rail within the GT;
      at least one first wheel positioned at least partially within and extending at least partially through one side of the two opposing sides of the sled body, the at least one first wheel extending at least partially into the sled slot to contact the rail within the GT for transporting the sled body within the GT; and
      at least one second wheel positioned at least partially within and extending at least partially through other side of the two opposing sides of the sled body, the at least one second wheel extending at least partially into the sled slot, opposite the at least one first wheel, to contact the rail within the GT for transporting the sled body within the GT.

2. The apparatus of claim 1, further comprising a towing system coupled with the nozzle engagement sled, the towing system for at least one of raising or lowering the nozzle engagement sled within the GT.

3. The apparatus of claim 2, wherein the nozzle engagement sled further includes a coupler for connecting with the towing system.

4. The apparatus of claim 3, wherein the coupler includes at least one of a hook, a loop or a slot sized to engage the towing system.

5. The apparatus of claim 3, wherein the towing system includes at least one of a line or a bar sized to engage the coupler.

6. The apparatus of claim 3, wherein the nozzle engagement sled further includes a lever connected with the locking member for actuating the locking member.

7. The apparatus of claim 6, wherein the lever is located on a side of the sled body adjacent the coupler.

8. The apparatus of claim 6, further comprising an actuator rod for engaging the lever.

9. The apparatus of claim 1, wherein the nozzle is located within a lower half of a casing of the GT.

10. The apparatus of claim 9, wherein the lower half of the casing has a horizontal joint surface, and wherein the nozzle is located below the horizontal joint surface.

11. The apparatus of claim 1, wherein the locking member includes at least one of a pin or a hook sized to complement the slot in the nozzle.

12. The apparatus of claim 1, wherein the rail within the GT is sized to engage a set of nozzles including the nozzle.

13. A method of installing a nozzle below a horizontal joint surface of a gas turbine (GT), the method comprising:
   coupling a nozzle maintenance apparatus to the nozzle, the nozzle maintenance apparatus having:
      a nozzle engagement sled for releaseably engaging the nozzle, the nozzle engagement sled including:
         a sled body including two opposing sides and a first side extending between and positioned adjacent the two opposing sides;
         a locking member coupled with the sled body, the locking member sized to complement a slot in the nozzle;
         a sled slot within the first side of the sled body and formed between the two opposing sides of the sled body, the sled slot for engaging a rail within the GT;
         at least one first wheel positioned at least partially within and extending at least partially through one side of the two opposing sides of the sled body, the at least one first wheel extending at least partially into the sled slot to contact the rail within the GT for transporting the sled body within the GT; and
         at least one second wheel positioned at least partially within and extending at least partially through other side of the two opposing sides of the sled body, the at least one second wheel extending at least partially into the sled slot, opposite the at least one first wheel, to contact the rail within the GT for transporting the sled body within the GT;
   lowering the nozzle maintenance sled and the nozzle into the GT; and
   actuating the locking member to disengage the nozzle inside the GT.

14. The method of claim 13, wherein the nozzle maintenance apparatus includes a towing system coupled with the nozzle engagement sled, wherein the towing system is configured to perform the lowering of the nozzle engagement sled and the nozzle within the GT.

15. The method of claim 14, wherein the nozzle engagement sled includes a coupler for connecting with the towing system.

16. The method of claim 13, wherein the nozzle engagement sled further includes a lever connected with the locking member, wherein actuating the locking member includes engaging the lever to modify a position of the locking member relative to the slot in the nozzle.

17. The method of claim 16, wherein actuating the locking member includes inserting an actuator rod inside the GT and engaging the actuator rod with the lever to modify the position of the locking member relative to the slot in the nozzle.

18. A method of un-installing a nozzle from a location below a horizontal joint surface of a gas turbine (GT), the method comprising:
   coupling a nozzle maintenance apparatus to the nozzle, the nozzle maintenance apparatus having:
      a nozzle engagement sled for releaseably engaging the nozzle, the nozzle engagement sled including:
         a sled body including two opposing sides and a first side extending between and positioned adjacent the two opposing sides;
         a locking member coupled with the sled body, the locking member sized to complement a slot in the nozzle;
         a sled slot within the first side of the sled body and formed between the two opposing sides of the sled body, the sled slot for engaging a rail within the GT;
         at least one first wheel positioned at least partially within and extending at least partially through one side of the two opposing sides of the sled body, the at least one first wheel extending at least partially into the sled slot to contact the rail within the GT for transporting the sled body within the GT; and
         at least one second wheel positioned at least partially within and extending at least partially through other side of the two opposing sides of the sled body, the at least one second wheel extending at least partially into the sled slot, opposite the at least one first wheel, to contact the rail within the GT for transporting the sled body within the GT; and raising the nozzle maintenance sled and the nozzle out of the GT.

19. The method of claim 18, wherein the coupling includes actuating the locking member to engage the nozzle inside the GT.

20. The method of claim 19, wherein the nozzle maintenance apparatus includes a towing system coupled with the nozzle engagement sled, wherein the towing system is configured to perform the raising of the nozzle engagement sled and the nozzle out of the GT, wherein the nozzle engagement sled includes a coupler for connecting with the towing system, wherein the nozzle engagement sled further includes a lever connected with the locking member, wherein actuating the locking member includes engaging the lever to modify a position of the locking member relative to the slot in the nozzle.

\* \* \* \* \*